(12) United States Patent
St. Clair

(10) Patent No.: US 9,058,104 B2
(45) Date of Patent: Jun. 16, 2015

(54) GESTURES FOR SPECIAL CHARACTERS

(75) Inventor: Luke St. Clair, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 147 days.

(21) Appl. No.: 13/558,089

(22) Filed: Jul. 25, 2012

(65) Prior Publication Data

US 2014/0028568 A1 Jan. 30, 2014

(51) Int. Cl.
*G06F 3/0488* (2013.01)

(52) U.S. Cl.
CPC ........ *G06F 3/04886* (2013.01); *G06F 3/04883* (2013.01)

(58) Field of Classification Search
CPC ...... G06F 3/017; G06F 3/0238; G06F 3/0233
USPC .................................................. 345/169–173
See application file for complete search history.

(56) References Cited

U.S. PATENT DOCUMENTS

2003/0006967 A1\* 1/2003 Pihlaja .......................... 345/168
2013/0055139 A1\* 2/2013 Polivka et al. ................ 715/776

\* cited by examiner

*Primary Examiner* — William Boddie
*Assistant Examiner* — Sahlu Okebato
(74) *Attorney, Agent, or Firm* — Baker Botts L.L.P.

(57) ABSTRACT

In one embodiment, a method includes displaying a keyboard on a touch-screen of a computing device; in response to a touch gesture within a display area of the touch-screen, the touch gesture comprising one or more paths that comprise two or more points on the touch-screen, determining a particular one of a plurality of characters corresponding to the touch gesture; and entering the particular one of the characters as user input to the computing device.

19 Claims, 13 Drawing Sheets

GESTURES FOR SPECIAL CHARACTERS

TECHNICAL FIELD

This disclosure generally relates to touch input.

BACKGROUND

A touch screen is an electronic visual display that detects the presence and location of user touch inputs. Mobile devices (such as a mobile phone, a tablet computer, and a laptop computer) often incorporate a touch screen to facilitate user interactions with application programs running on the mobile device.

DESCRIPTION OF EXAMPLE EMBODIMENTS

A touchpad is an input device including a surface that detects touch-based inputs of users. Similarly, a touch screen is an electronic visual display surface that detects the presence and location of user touch inputs. So-called dual touch or multi-touch displays or touchpads refer to devices that can identify the presence, location and movement of more than one touch input, such as two- or three-finger touches. A system incorporating one or more touch-based input devices may monitor one or more touch-sensitive surfaces for touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events or gestures (e.g., tap, drag, swipe, pinch).

Figure 1:
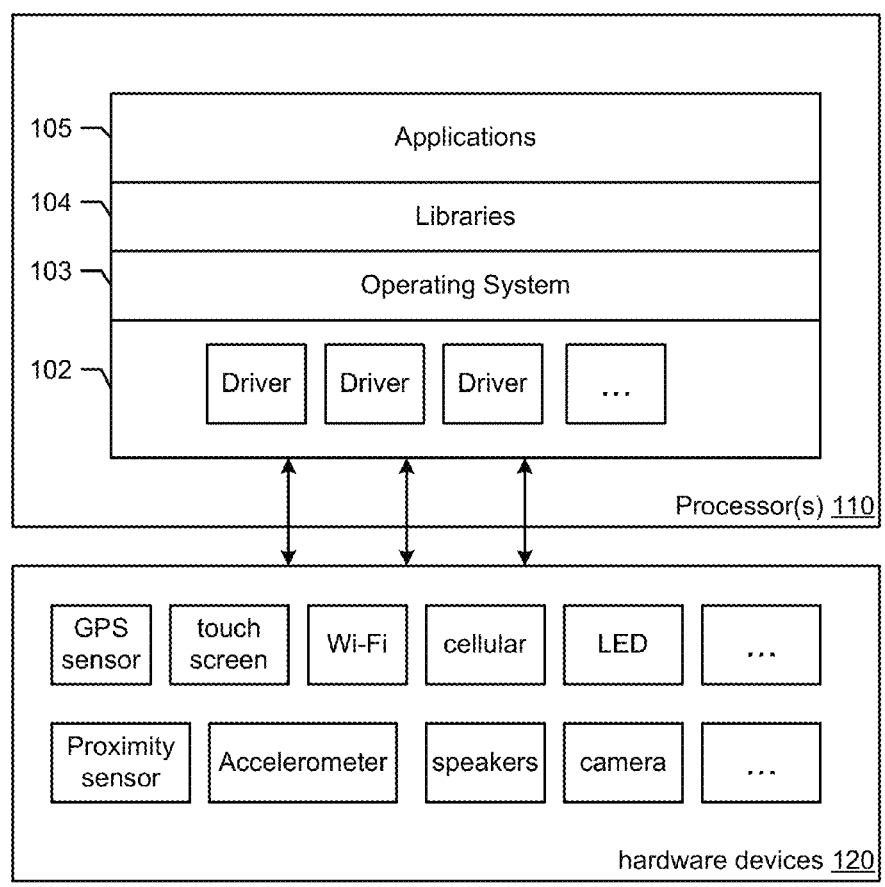
FIG. 1 illustrates an example processing stack of a mobile device.

Recognition of touch events by a system with one or more touch-based input devices—i.e., identifying one or more touch inputs by a user and determining corresponding touch event(s)—may be implemented by a combination of hardware, software, or firmware (or device drivers). FIG. 1 illustrates an example processing stack of a mobile device (e.g., a smart phone, a tablet computer). In the example of FIG. 1, the mobile device may comprise hardware devices (120) such as Input-Output (I/O) devices (e.g., a touch screen, speakers, a light-emitting diode or LED indicator, a camera, etc.), communication interface devices (e.g., a cellular interface, a Wi-Fi interface), sensors (e.g., a Global Positioning System or GPS sensor, a proximity sensor, an accelerometer, etc.), and other hardware devices. One or more device drivers in driver layer 102 hosted by one or more processors 110 of the mobile device can communicate and control the hardware devices. One or more processors 110 can execute various software programs, for example, operating system 103 running one or more application programs (e.g., web browser, address book, etc.) in applications 105 and managing one or more hardware devices via the one or more device drivers in driver layer 102. Libraries 104 can include one or more libraries used by one or more application programs in applications 105. For example, the mobile device may comprise one or more device drivers communicating with one or more touch-based input devices and detecting touch inputs. The system may comprise a touch gesture library containing touch event modules or computer program code for interpreting touch inputs detected by the device drivers to touch events or gestures. A program running on the mobile device can detect and process touch events by subscribing as listeners to touch event modules in the touch gesture library.

Figure 2:
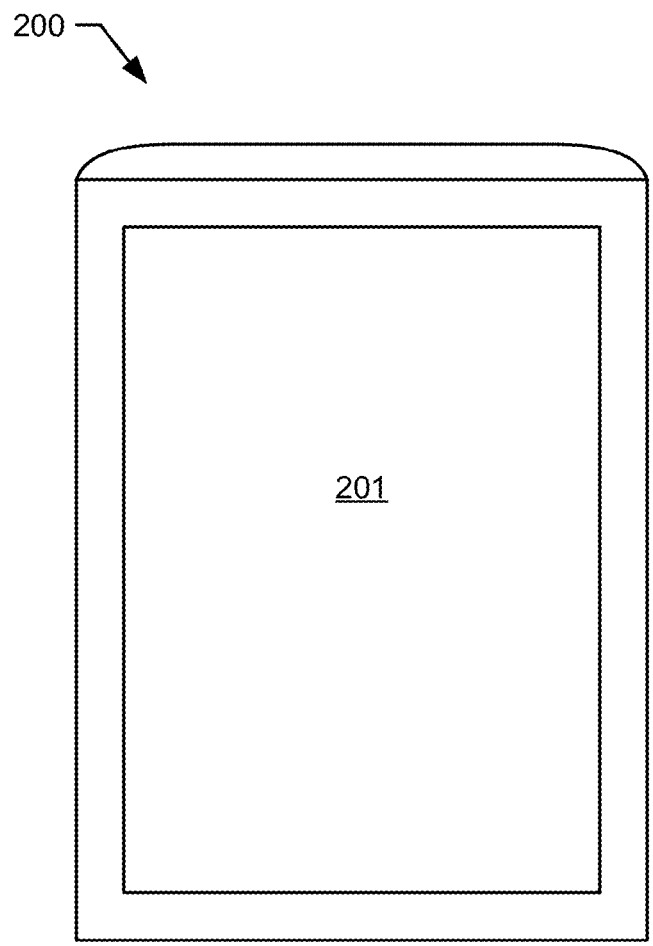
FIG. 2 illustrates an example mobile device.

FIG. 2 illustrates an example mobile device. In the example of FIG. 2, mobile device 200 may comprise a housing with a touch display 201 disposed on a front side of the housing. Touch display 201 may be a single-touch, dual-touch, or multi-touch display. Mobile device 200 may comprise a touch gesture library containing touch event modules or logic that can recognize touch inputs, and determine one or more corresponding touch events or gestures (e.g., tap, draft, swipe, pinch). One or more applications hosted by mobile device 200 may be configured to detect and respond to one or more touch events or gestures by subscribing as listeners to touch event modules in the touch gesture library.

Figure 3A:
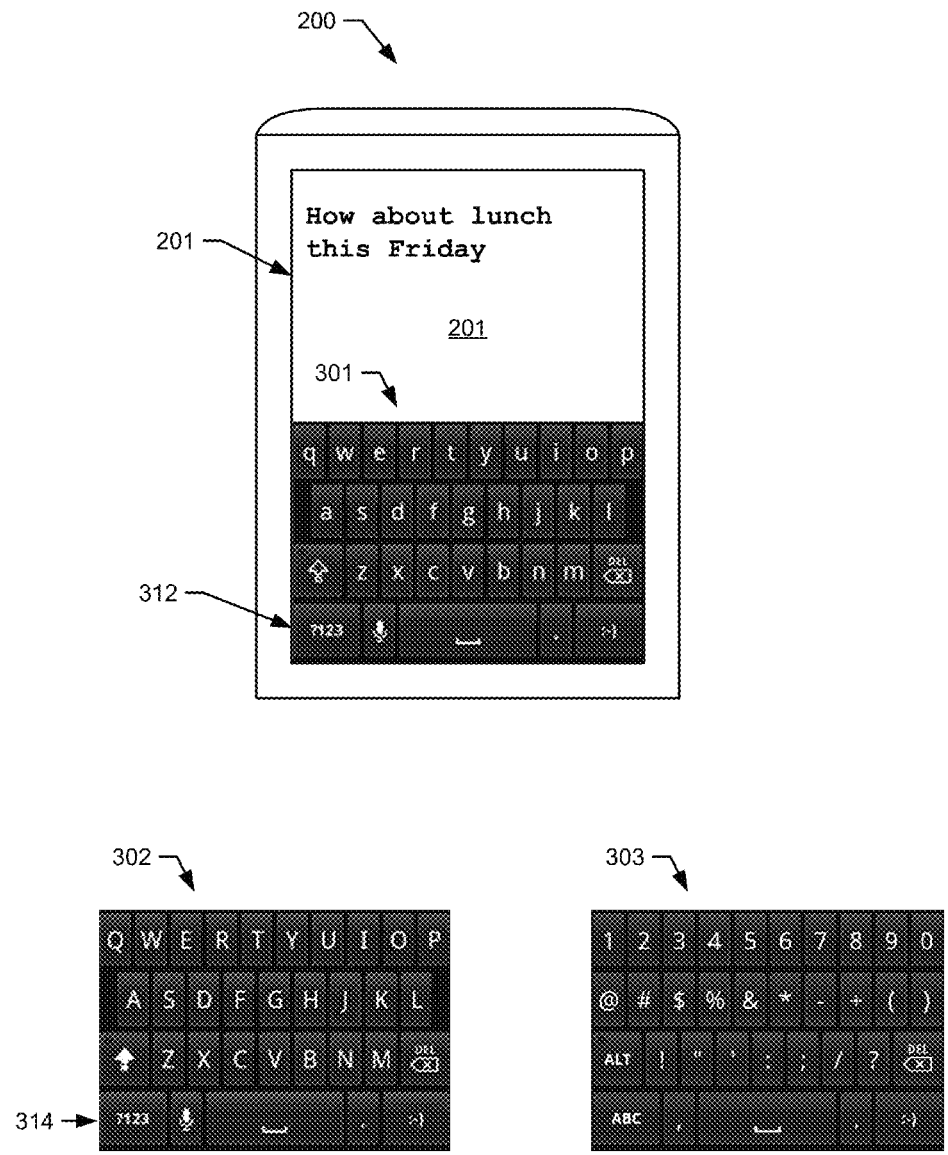
FIGS. 3A-3G illustrate a user interface of an messaging application hosted by a mobile device.

A touch-screen keyboard is a software keyboard displayed in a touch screen of a computing device. A user of the computing device can interact with an application running on the computing device by using touch inputs on the touch-screen keyboard. FIG. 3A illustrates an example touch-screen keyboard. In the example of FIG. 3A, a user may interact with an application (e.g., a messaging application, a notepad application, a web browser) running on computing device 200 with touch-screen keyboard 301. A user of the application can enter characters by tapping on touch-screen keyboard 301. For example, the user may tap on "w" of touch-screen keyboard 301. The application (or a process of the application) may detect a single-tap touch event within the region of touch display 201 corresponding to "w" of touch-screen keyboard 301, and process the character entered ("w") accordingly (e.g., store the character in a software buffer of the application, or display the character in the application's user interface).

Ordinarily, a user may enter a special character (e.g., a question mark, a comma, a dollar sign) by using a touch-screen keyboard dedicated to special characters. For example, an application running on computing device 200 may provide three touch-screen keyboards: a lower-case touch-screen keyboard 301, an upper-case touch-screen keyboard 302, and a numbers and symbols touch-screen keyboard 303, as illustrated in FIG. 3A. A user of the application may switch from lower-case touch-screen keyboard 301 (or from upper-case touch-screen keyboard 302) to numbers and symbols touch-screen keyboard 303 by tapping on a keyboard switch key 312 (or 314). The application may detect a single-tap event within the region on touch display 201 corresponding to keyboard switch key 312 (or 314), and display numbers and symbols touch-screen keyboard 303 (in place of lower-case or upper-case touch-screen keyboard 301 or 302) in touch display 201. The user may enter a special character (e.g., a question mark) by tapping on a keyboard-switching key (e.g., 312 or 314 illustrated in FIG. 3A) to switch to numbers and symbols touch-screen keyboard 303, then tapping on "?" within numbers and symbols touch-screen keyboard 303. Particular embodiments provide intuitive ways for entering special characters in a user interface displayed in a touch screen. In particular embodiments, a user may enter a special character by performing a touch gesture on the touch screen, without switching to a dedicated touch-screen keyboard for special characters (such as numbers and symbols touch-screen keyboard 303 illustrated in FIG. 3A).

Figure 4:
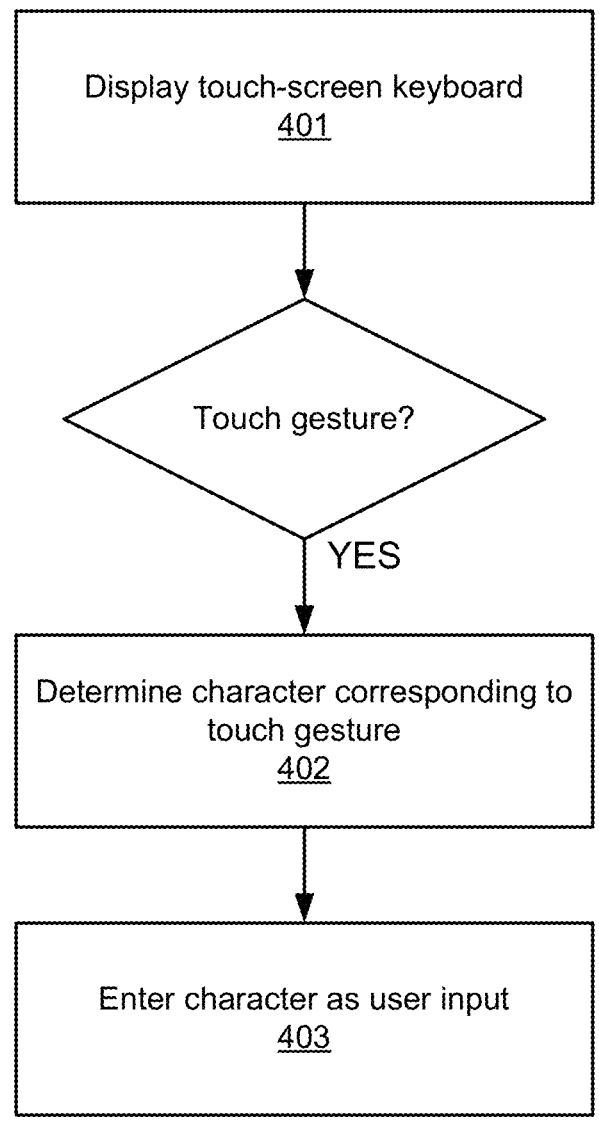
FIG. 4 illustrates an example method for entering a special character by using a touch gesture.

FIG. 4 illustrates an example method for entering a special character by using a touch gesture. The example method of FIG. 4 can be implemented by an application (or an operating system) hosted by one or more processors of a computing device. In particular embodiments, a computing device may be a client device with a touch-screen display. For example, a computing device may be a mobile phone, a tablet computer, a handheld gaming console, or any suitable computing device with a touch-screen display. For example, a computing device may be mobile device 200 with touch display 201 as illustrated in FIG. 2. In particular embodiments, an application hosted by one or more processors of the computing device may provide one or more touch-screen keyboards for user interaction with the application (or another application). For example, the touch-screen keyboards may comprise lower-case and upper-case QWERTY touch-screen keyboards and a numbers and symbols marks touch-screen keyboard as illustrated in FIG. 3A. For example, the touch-screen keyboards may comprise a standard layout (e.g., QWERTY) and a non-standard layout (e.g., Dvorak). For example, the touch-screen keyboards may comprise touch-screen keyboards in a first language (e.g., English) and in a second language (e.g., Traditional Chinese). This disclosure contemplate any suitable touch-screen keyboards and any suitable combinations of these touch-screen keyboards. In particular embodiments, the application may display a touch-screen keyboard on the touch-screen of the computing device (STEP 401). For example, the application may display lower-case touch-screen keyboard 301 in touch display 201 of mobile device 200 as illustrated in FIG. 3A.

Figure 3B:
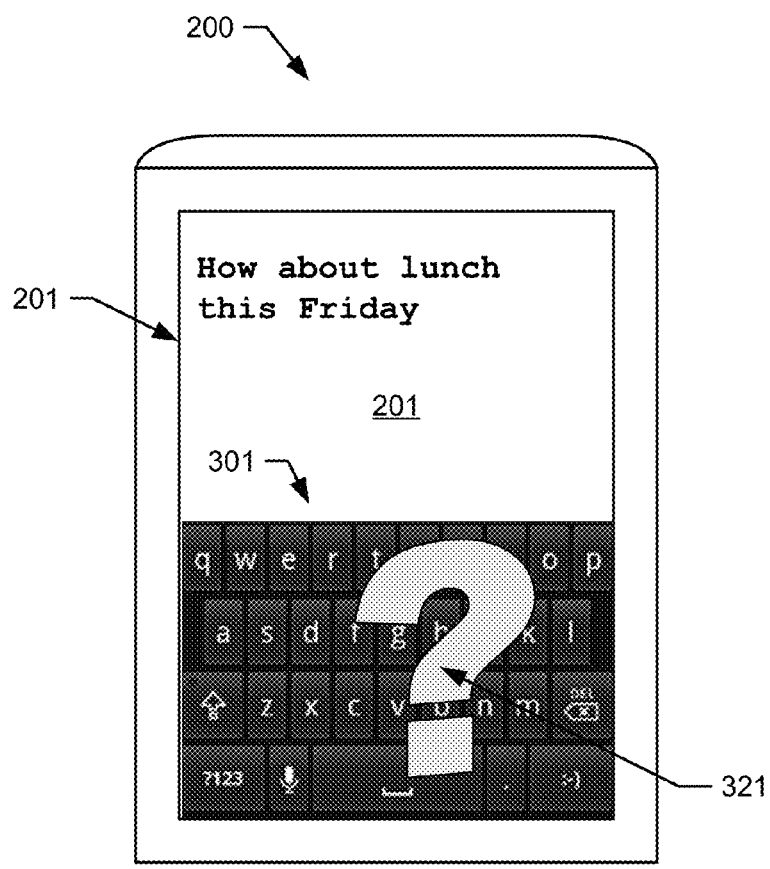
Figure 3C:
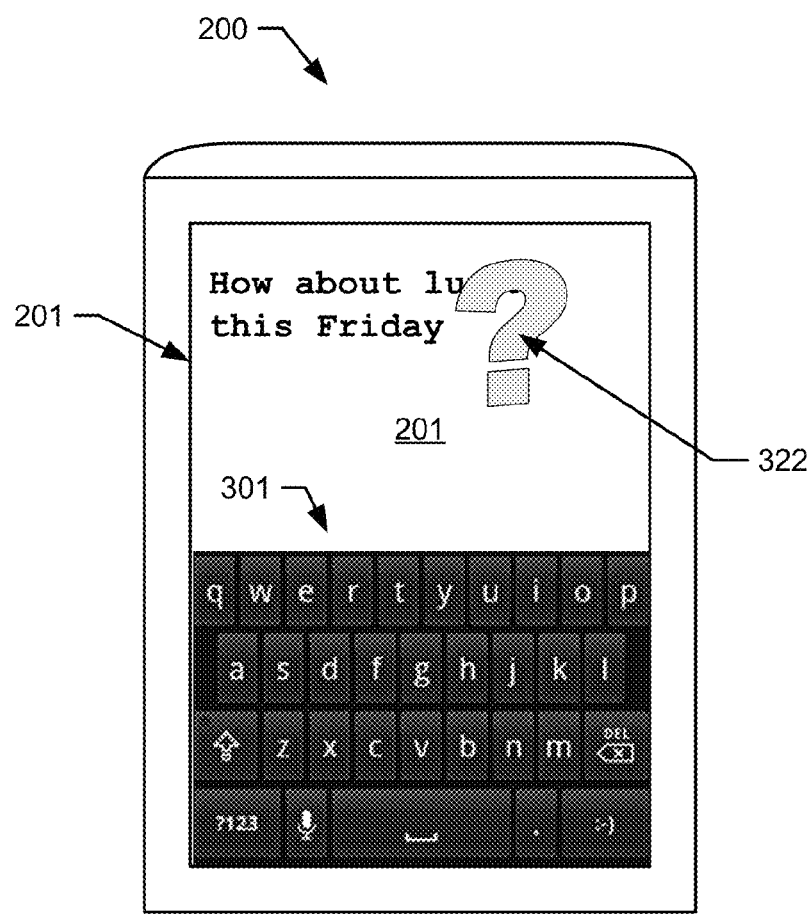
Figure 3D:
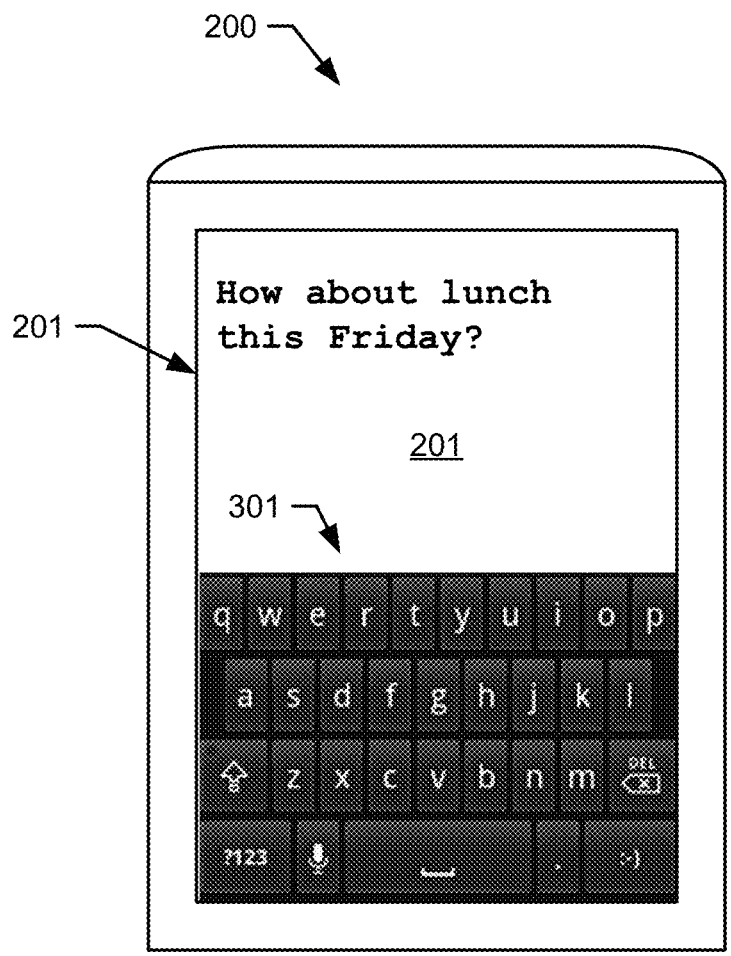

In particular embodiments, the application may detect a touch gesture performed by a user within a display area of the touch-screen. The application may detect a touch gesture by subscribing as listeners to touch event modules as described earlier. In particular embodiments, the touch gesture may comprise one or more paths that comprise two or more points on the touch-screen. In particular embodiments, in response to the touch gesture, the application may determine a particular one of a plurality of characters corresponding to the touch gestures (STEP 402). In particular embodiments, the application may enter the particular one of the characters as user input to the computing device (STEP 403). For example, a user may enter with lower-case and upper-case touch-screen keyboards 301 and 302 a text string "How about lunch this Friday" in a messaging application's user interface, as illustrated in FIG. 3A. The user may perform a touch gesture comprising two paths with multiple points within a display area of lower-case touch-screen keyboard 301 on touch display 201, as illustrated by the paths 321 in FIG. 3B. That is, the user may "draw" a question mark over lower-case touch-screen keyboard 301 on touch display 201. This disclosure contemplates any suitable placement within the touch-screen for the touch gesture. For example, the user may perform the touch gesture (i.e., drawing a question mark) adjacent to the end of the text string "How about lunch this Friday" displayed in touch display 201, as illustrated by paths 322 in FIG. 3C. The messaging application may detect the touch gesture, and determine a special character (i.e., "?") that corresponds to the touch gesture illustrated by the paths in FIG. 3B (or in FIG. 3C). The messaging application may enter "?" as user input, and display it following the text string ("How about lunch this Friday?") in the messaging application's user interface, as illustrated in FIG. 3D. This disclosure contemplates any suitable characters that a user may enter by a touch gesture as illustrated by the example method of FIG. 4. For example, characters entered (drawn) by a user with a touch gesture may be a comma, em dash, en dash, parenthesis, caret, slash, tilde, quotation mark, or question mark. Moreover, characters entered with a touch gesture by the example method of FIG. 4 may be in any suitable languages, such as Arabic, Chinese, Hangul, Hindi, or Kanji characters.

Figure 3E:
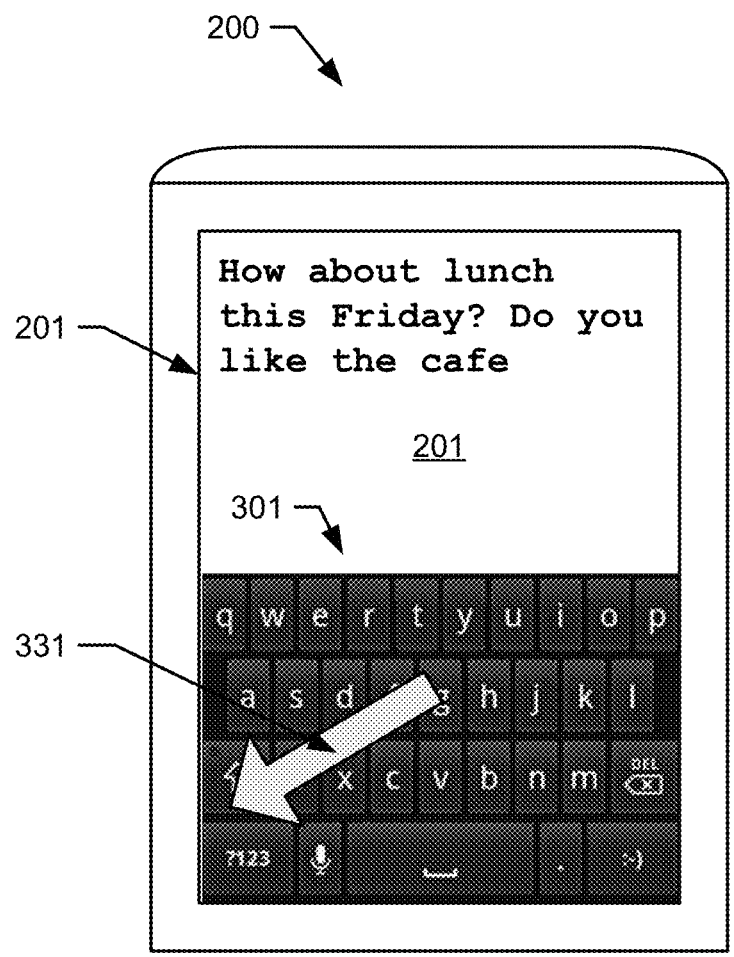
Figure 3F:
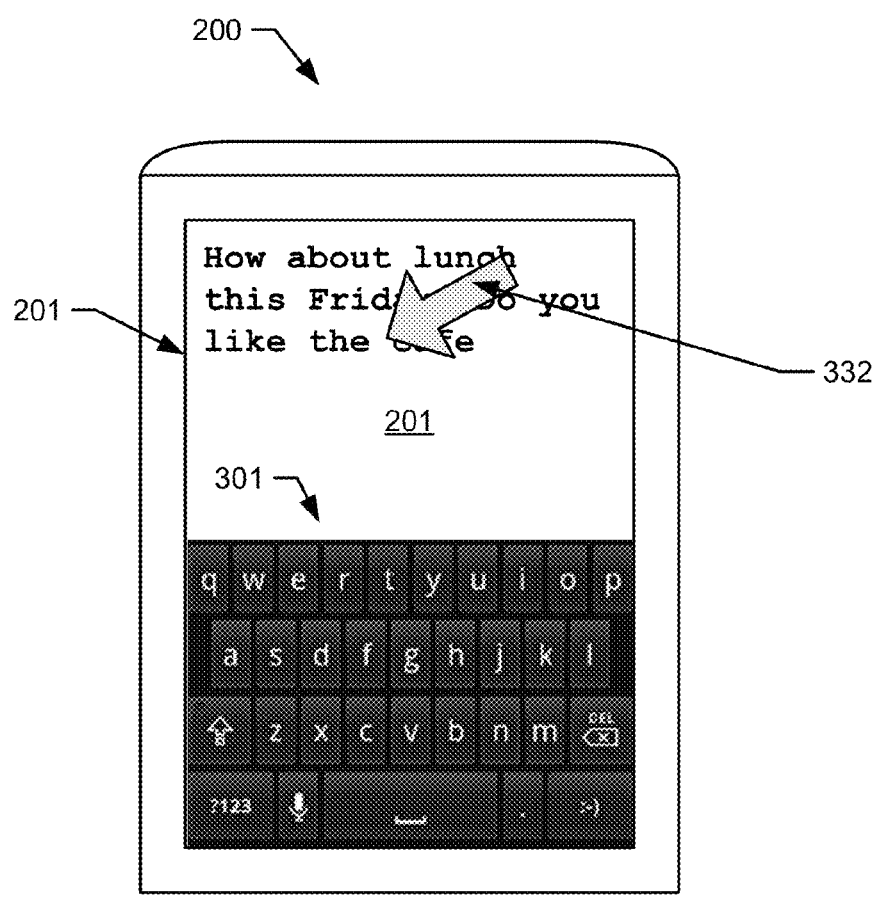
Figure 3G:
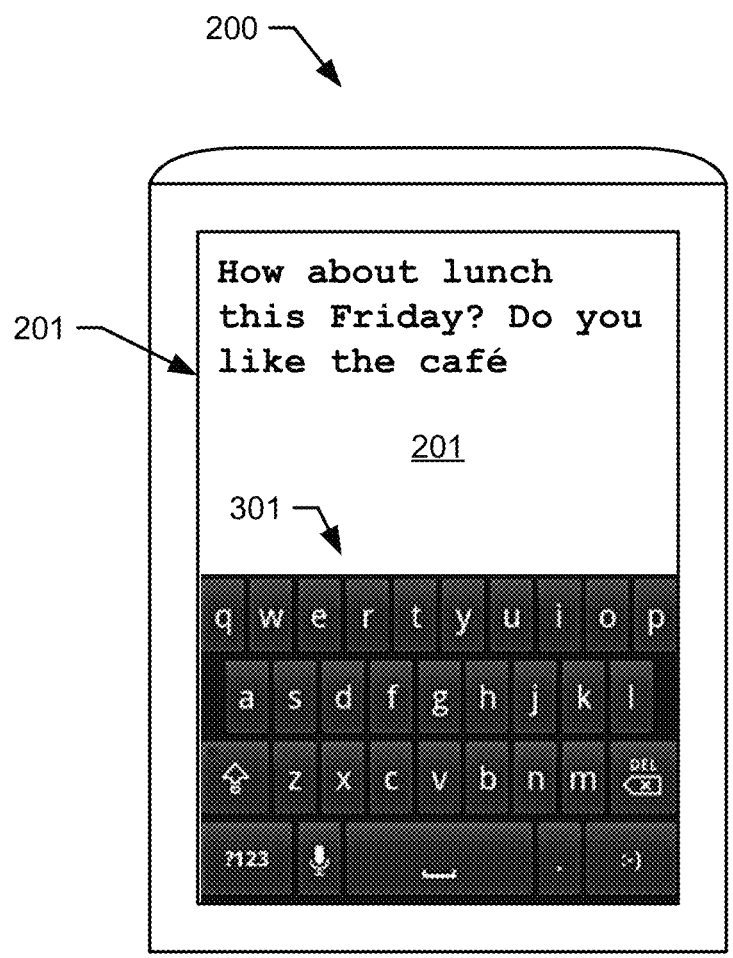

As for another example, the user may continue entering another text string "Do you like the cafe" in the messaging application's user interface with lower-case and upper-case touch-screen keyboards 301 and 302, as illustrated in FIG. 3E. The user may perform a touch gesture comprising a path with an oblique angle 331 within the display area of low-case keyboard 301 as illustrated in FIG. 3E. The user may perform the touch gesture at any suitable position within touch display 201 (e.g., above the last character just entered as illustrated by a path with an oblique angle 332 in FIG. 3F). The messaging application may detect the touch gesture, and determine an acute diacritical mark (" "). The messaging application may modify, with the determined diacritical mark, a character entered with touch-screen keyboard 301 (or 302) immediately before the touch gesture, as illustrated in FIG. 3G. That is, the user may accent a character just entered (e.g., "e") by drawing a diacritical mark (e.g., " ") on touch display 201. In response to the user's touch gesture (i.e., drawing the acute diacritical mark " ") on touch display 201, the messaging application may determine a diacritical mark corresponding to the touch gesture, and accent the character entered immediately before the touch gesture by the determined diacritical mark (e.g., "é"). This disclosure contemplates accenting a character in any suitable language (e.g., German, French, Arabic, Hebrew, Korean, and so on) with any suitable diacritical mark (e.g., acute " ", grave "", diaeresis "", ring "º", and so on) drawn by a user in a touch-display of a computing device.

Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, an application (or an operating system of the computing device) may store in a local storage of the computing device, a user preference file comprising user-specific data for the feature of entering special characters by touch gestures as illustrated by the example method of FIG. 4. For example, a user of the computing device may turn on or off the feature of entering special characters by touch gestures for the application, causing the application to store the user's preference (e.g., the feature is turned off) in the user preference file. For another example, the application may use a machine learning algorithm to dynamically improve the accuracy of recognition of a user's touch gestures for entering special characters, while storing in the user preference file training data for the machine learning algorithm. In particular embodiments, the application may transmit and store the user preference file in a remote server over the Internet (i.e., the user preference file is hosted in the "cloud"). In particular embodiments, the user may access the user preference file (stored in the remote server over the Internet) from another computing device of the user. That is, the user preference file may be synchronized among some or all of the user's computing devices. For example, the user may turn off (from being turned on) the feature of entering special characters by touch gestures for the application on the user's mobile phone, causing the application to store the change in the local and remote copies of the user preference file. As the user accesses the user's tablet computer, an application (or an operating system) running on the tablet computer may access the user preference file stored in the remote server and turn off the feature of entering special characters by touch gestures accordingly. Although this disclosure describes or illustrates particular features being synchronized among multiple computing devices of a user, this disclosure contemplates synchronizing any suitable number of any suitable features among any suitable computing devices of the user (e.g. by using user preference files as described above). For another example, the user may acquire a new mobile phone. An application or operating system running on the new mobile phone may access the user preference file stored in the remote server for the training data from the user's existing (or previously owned) mobile phone (or another computing device). Based on the training data, the application on the new mobile phone may accurately recognize the user's touch gesture for entering special characters, without further utilizing the machine learning algorithm.

In some embodiments, the feature of entering special characters by touch gestures (as illustrated by the example method of FIG. 4) may be turned on or off on the user's computing device based on activities of the user's social contacts in a social-networking system. For example, the feature of entering special characters by touch gestures on a user's computing device may be turned on if a number of the user's social contacts within a specified social distance (e.g., two degrees or separation) exceeds a specified threshold (e.g., 10). For example, a user preference file (for the feature of entering special characters by touch gestures) described above may be stored with a corresponding user node in the social graph of the social-networking system. An application on a particular user's computing device may access the social graph, determine that more than 10 of the particular user's first- and second-degree friends have the feature activated (turned on) on their respective computing devices, and turn on the feature on the particular user's computing device accordingly. The application may make a suggestion (within its user interface) to the particular user about the feature, and turn on the feature based on the user's confirmation. That is, the particular user may "discover" the feature of entering special characters based on touch gestures, if more than 10 of his first- and second-degree friends having the feature activated on their respective computing devices. Moreover, this disclosure contemplates any suitable feature that may be turned on or off on a user's computing device based on activities of the user's social contacts in the social-networking system (e.g., by using user preference files stored in the social graph as described above). The social-networking system and social graph are described later.

A social-networking system, such as a social-networking website, may enable its users to interact with it and with each other through it. The social-networking system may create and store a record (such as a user profile) associated with the user. The user profile may include demographic information on the user, communication-channel information for the user, and personal interests of the user. The social-networking system may also create and store a record of the user's relationships with other users in the social-networking system (e.g. a social graph), as well as provide social-networking services (e.g. wall-posts, photo-sharing, or instant-messaging) to facilitate social interaction between or among users in the social-networking system.

A social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various system, including the social-networking system. For example, the user may provide his name, profile picture, city of residence, contact information (e.g., a phone number, an email address), birth date, gender, marital status, family status, employment, education background, preferences, interests, and other demographical information to be included in the user node. Each user node of the social graph may correspond to a web page (typically known as a profile page). For example, in response to a request including a user name, the social-networking system can access a user node corresponding to the user name, and construct a profile page including the name, a profile picture, and other information associated with the user. A concept node may correspond to a concept of the social-networking system. For example, a concept can represent a real-world entity, such as a movie, a song, a sports team, a celebrity, a restaurant, or a place or a location. An administrative user of a concept node corresponding to a concept may create the concept node by providing information of the concept (e.g., by filling out an online form), causing the social-networking system to create a concept node comprising information associate with the concept. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept. An edge between a pair of nodes may represent a relationship between the pair of nodes. For example, an edge between two user nodes can represent a friendship between two users. For example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user likes a celebrity). In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

A social-networking system may support a variety of applications, such as photo sharing, on-line calendars and events, instant messaging, and advertising. For example, the social-networking system may also include media sharing capabilities. For example, the social-networking system may allow users to post photographs and other multimedia files to a user's profile page (typically known as wall posts) or in a photo album, both of which may be accessible to other users of the social-networking system. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 5:
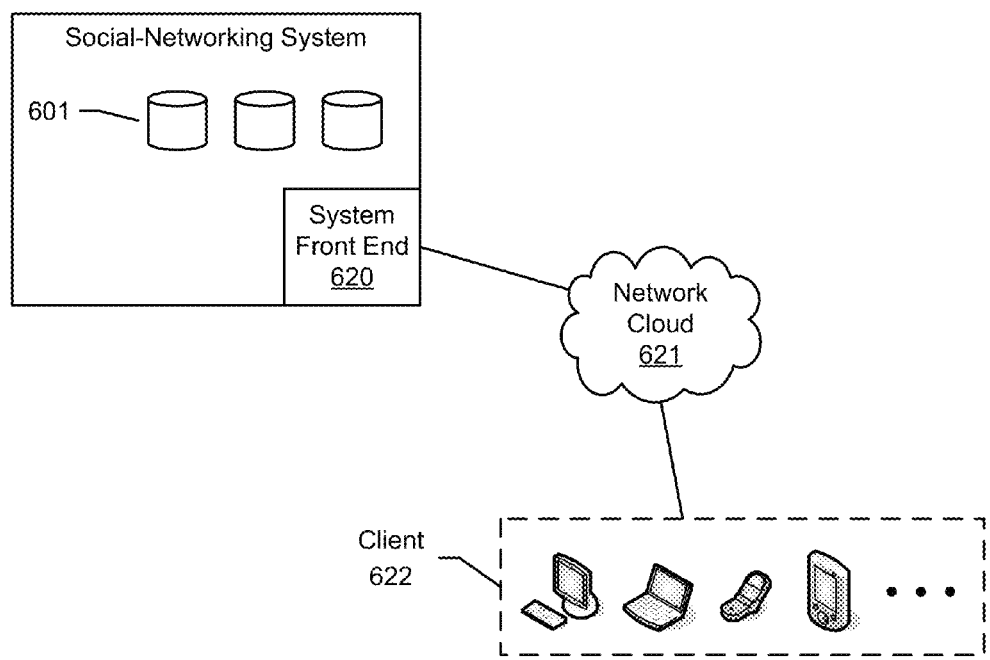
FIG. 5 illustrates an example network environment of a social-networking system.

FIG. 5 illustrates an example network environment of a social-networking system. In particular embodiments, a social-networking system may comprise one or more data stores 601. For example, each data store 601 may comprise one or more storage devices. In particular embodiments, the social-networking system may store in data stores 601 a social graph comprising user nodes, concept nodes, and edges between nodes as described earlier. Each user node may comprise one or more data objects corresponding to information associated with a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system may comprise one or more computing devices (e.g., servers) hosting functionality directed to operation of the social-networking system. In particular embodiments, one or more of data stores 601 may be operably connected to the social-networking system's front end 620. A user of the social-networking system may access the social-networking system using a client device such as client device 622. In particular embodiments, front end 620 may interact with client device 622 through network cloud 621. For example, front end 620 may be implemented in software programs hosted by one or more computing devices of the social-networking system. Front end 620 may include web or HTTP server functionality, as well as other functionality, to allow users to access the social-networking system.

Client device 622 may be a desktop computer, laptop computer, tablet computer, personal digital assistant (PDA), in- or out-of-car navigation system, smart phone or other cellular or mobile phone, or mobile gaming device, among other suitable computing devices. Client device 622 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network.

Network cloud 621 may represent a network or collection of networks (such as the Internet, a corporate intranet, a virtual private network, a local area network, a wireless local area network, a cellular network, a wide area network, a metropolitan area network, or a combination of two or more such networks) over which client devices 622 may access the social network system.

In particular embodiments, the social-networking system may store in data stores 601 data associated with applications and services provided by the social-networking system. In particular embodiments, the social-networking system may store user event data in data stores 601. For example, a user may register a new event by accessing a client application to define an event name, a time and a location, and cause the newly created event to be stored (e.g., as a concept node) in data stores 601. For example, a user may register with an existing event by accessing a client application to confirming attending the event, and cause the confirmation to be stored in data stores 601. For example, the social-networking system may store the confirmation by creating an edge in a social graph between a user node corresponding to the user and a concept node corresponding to the event, and store the edge in data stores 601.

Figure 6:
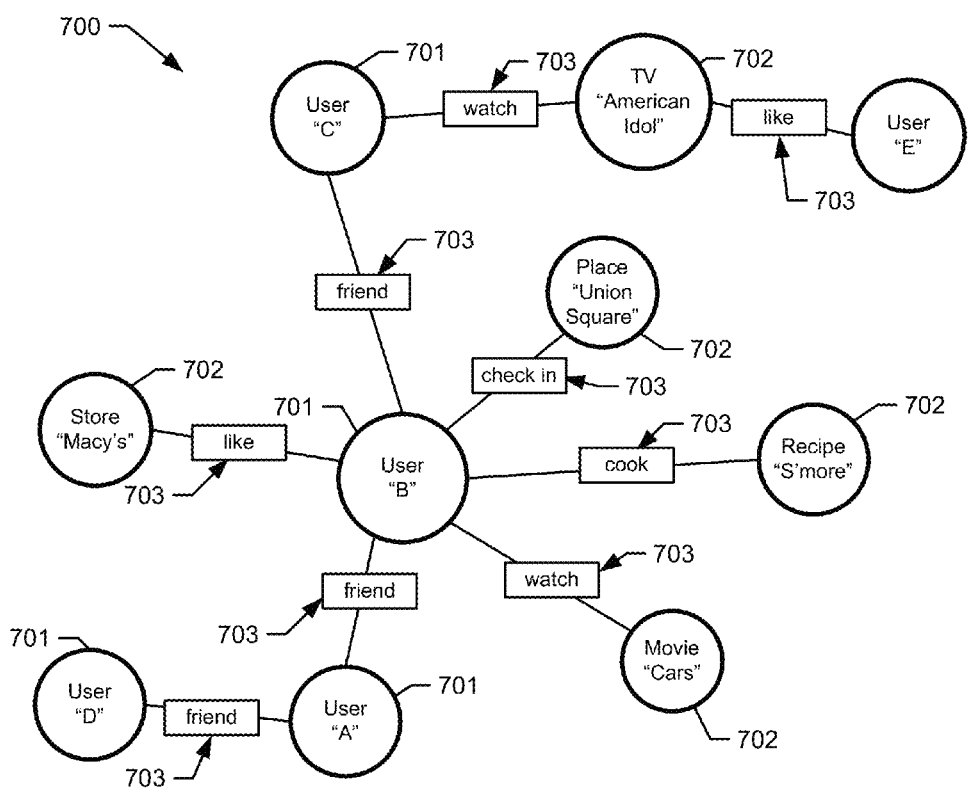
FIG. 6 illustrates an example social graph.
Figure 7:
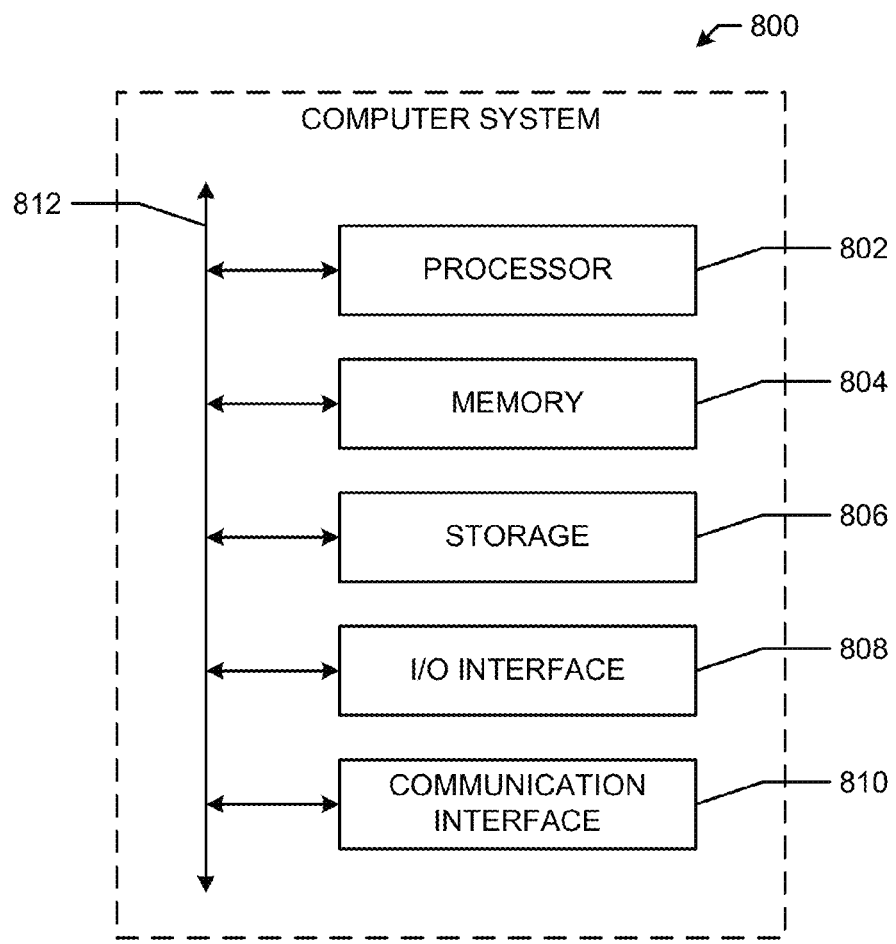
FIG. 7 illustrates an example computer system.

FIG. 6 illustrates an example social graph 700. In the example of FIG. 7, social graph 700 may include user nodes 701, concept nodes 702, and edges 703 between nodes. An edge 703 between a pair of nodes may represent a relationship (or an action) between the pair of nodes. For example, user "B" is a friend of user "A" and user "C", respectively, as illustrated by the edges between users nodes "B" and "A", and between users nodes "B" and "C." For example, users "C" watches TV show "American Idol", as illustrated by the edges between the "American Idol" concept node and user nodes "C." Similarly, the edge between the user node "B" and the concept node "Macy's" may indicate that user "B" likes "Macy's." The edge between user node "B" and the "Cars" concept node indicates that user "B" watches the movie "Cars." The edge between user node "B" and the "S'more" concept node indicates that user "B" cooks the recipe "S'more." The edge between user node "B" and the "Union Square" concept nodes indicates that user "B" checks in to "Union Square." The edge between user node "E" and the "American Idol" concept node indicates that user "E" likes TV show "American Idol." Note that a social graph can be much larger than social graph 700 illustrated in FIG. 7. For example, a social graph used by Facebook of Menlo Park, Calif. can have a number of nodes in the order of $10^8$, and a number of edges in the order of $10^{10}$.

As described earlier, an edge between a pair of nodes may indicate a direct relationship between the pair of nodes. It is also desirable to determine likelihood of a relationship or an interest between a pair of nodes that are two or more hops away. For example, the social-working system may provide (e.g., via an email or a wall-post) a recommendation (e.g., an advertisement) for "Macy's" to user "B", given the direct relationship represented by the edge between the user node "B" and the concept node "Macy's" as illustrated in FIG. 7. The social-networking system may also provide a recommendation for "Macy's" to first-degree friends of user "B" (e.g., users "C" and "A") as first-degree friends often share comment interests.

FIG. 7 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   displaying to a user, by a computing device, a keyboard on a touch-screen of the computing device;
   receiving, at the computing device, a suggestion to turn on a touch-gesture feature, wherein the suggestion is sent to the user when a number of the user's social contacts in a social-networking system who have the touch-gesture feature turned on exceeds a threshold number;
   enabling the touch-gesture feature based on information associated with the user's social contacts and a received user response to the suggestion;
   determining, based on information associated with the user's social contacts in a social-networking system, that a touch-gesture feature should be turned on and enabling the touch-gesture feature;
   in response to detection of a touch gesture within a display area of the touch-screen, the touch gesture comprising one or more paths that comprise two or more points on the touch-screen, determining, by the computing device, a particular one of a plurality of characters corresponding to the one or more paths of the touch gesture independent of a location of the touch gesture on the touch-screen; and
   entering, by the computing device, the particular one of the characters as user input to the computing device.

2. The method of claim 1, wherein the particular character is a comma, em dash, en dash, parenthesis, caret, slash, tilde, quotation mark, or question mark.

3. The method of claim 1, wherein the particular character is an Arabic, Chinese, Hangul, Hindi, or Kanji character.

4. The method of claim 1, wherein the determining the particular one of the characters comprises:
   determining a diacritical mark corresponding to the touch gesture; and
   modifying, with the diacritical mark, a character entered with the keyboard immediately before the touch gesture.

5. The method of claim 1, wherein the touch gesture occurs at or near a location within the display area displaying a character entered with the keyboard immediately before the touch gesture.

6. The method of claim 1, wherein the touch gesture occurs at or near a location within the display area displaying the keyboard.

7. One or more computer-readable non-transitory storage media embodying software that is operable when executed to:
   display to a user a keyboard on a touch-screen of a computing device;
   receive a suggestion to turn on a touch-gesture feature, wherein the suggestion is sent to the user when a number of the user's social contacts in a social-networking system who have the touch-gesture feature turned on exceeds a threshold number;
   enable the touch-gesture feature based on information associated with the user's social contacts and a received user response to the suggestion;
   in response to detection of a touch gesture within a display area of the touch-screen, the touch gesture comprising one or more paths that comprise two or more points on the touch-screen, determine a particular one of a plurality of characters corresponding to the one or more paths of the touch gesture independent of a location of the touch gesture on the touch-screen; and
   enter the particular one of the characters as user input to the computing device.

8. The media of claim 7, wherein the particular character is a comma, em dash, en dash, parenthesis, caret, slash, tilde, quotation mark, or question mark.

9. The media of claim 7, wherein the particular character is an Arabic, Chinese, Hangul, Hindi, or Kanji character.

10. The media of claim 7, wherein to determine the particular one of the characters, the software is operable when executed to:
    determine a diacritical mark corresponding to the touch gesture; and
    modify, with the diacritical mark, a character entered with the keyboard immediately before the touch gesture.

11. The media of claim 7, wherein the touch gesture occurs at or near a location within the display area displaying a character entered with the keyboard immediately before the touch gesture.

12. The media of claim 7, wherein the touch gesture occurs at or near a location within the display area displaying the keyboard.

13. A device comprising:
    one or more processors; and
    one or more computer-readable non-transitory storage media coupled to the processors and embodying software that is operable when executed by the processors to:
      display to a user a keyboard on a touch-screen of the device;
      receive a suggestion to turn on a touch-gesture feature, wherein the suggestion is sent to the user when a number of the user's social contacts in a social-networking system who have the touch-gesture feature turned on exceeds a threshold number;
      enable the touch-gesture feature based on information associated with the user's social contacts and a received user response to the suggestion;
      in response to detection of a touch gesture within a display area of the touch-screen, the touch gesture comprising one or more paths that comprise two or more points on the touch-screen, determine a particular one of a plurality of characters corresponding to the one or more paths of the touch gesture independent of a location of the touch gesture on the touchscreen; and enter the particular one of the characters as user input to the device.

14. The device of claim 13, wherein the particular character is a comma, em dash, en dash, parenthesis, caret, slash, tilde, quotation mark, or question mark.

15. The device of claim 13, wherein to determine the particular one of the characters, the software is operable when executed by the processors to:

determine a diacritical mark corresponding to the touch gesture; and modify, with the diacritical mark, a character entered with the keyboard immediately before the touch gesture.

16. The device of claim 13, wherein the touch gesture occurs at or near a location within the display area displaying a character entered with the keyboard immediately before the touch gesture.

17. The method of claim 1, wherein the information associated with the user's social contacts comprises whether a number of the user's social contacts who have the touch-gesture feature turned on exceeds a threshold number.

18. The method of claim 1, wherein the enabling of the touch-gesture feature is further based on a user preference file associated with the user.

19. The method of claim 1, wherein the received user response comprises a confirmation.

\* \* \* \* \*